United States Patent [19]
Gustin

[11] Patent Number: 5,682,836
[45] Date of Patent: Nov. 4, 1997

[54] HEATED WATERING TROUGHS FOR LIVESTOCK

[75] Inventor: Jean-Pierre Gustin, Charleville Meziere, France

[73] Assignee: La Buvette, Charleville Mezieres, France

[21] Appl. No.: 674,908

[22] Filed: Jul. 3, 1996

[30] Foreign Application Priority Data

Jul. 5, 1995 [FR] France ................... 95 08097

[51] Int. Cl.⁶ ..................................... A01K 7/00
[52] U.S. Cl. ............................................. 119/73
[58] Field of Search .................. 119/73, 51.5, 61

[56] References Cited

U.S. PATENT DOCUMENTS 2,512,510  6/1950  Wartes ........................ 119/73
2,914,025  11/1959  Mc Murray.
4,640,229  2/1987  Swartzendruber et al. .......... 119/51.5

FOREIGN PATENT DOCUMENTS 2555019   5/1985   France.
2 601 847  1/1988   France.
93 20 193  2/1994   Germany.

Primary Examiner—Thomas Price
Attorney, Agent, or Firm—Young & Thompson

[57] ABSTRACT

A heated watering trough for livestock of the type comprising a central body, forming a warm water reservoir, about which are disposed a plurality of drinking bowls. The central body (1) is provided with a plurality of vertical indentations (6, 7), each terminating at its base in a shoulder (6a, 7a), in which is provided a hollow recess (9, 10) having the shape of a watering bowl and being provided with a water supply valve from the central reservoir (1). The portions (8) comprised between the indentations (6, 7) constitute separations between the different watering stations permitting several animals to drink simultaneously without fighting among themselves.

4 Claims, 2 Drawing Sheets

HEATED WATERING TROUGHS FOR LIVESTOCK

BACKGROUND OF THE INVENTION

1. Description of the Related Art

In French patent No. 83.18472, published under No. 2.555.019, filed by the applicant, there is described a heated watering trough constituted by two distinct chambers of different volumes, the larger containing a large quantity of heated water at moderate temperature, the second, serving as a watering bowl, being enclosed in the first which heats it in the manner of a bain-marie.

In French patent No. 86.10679, also in the name of the applicant, there is described a watering trough constituted by a cylindrical reservoir, filled with warm water, this reservoir being provided, on its sides, with a plurality of watering bowls each provided with a valve controlled by the animal.

In German Utility Model No. 93.20193, there is also disclosed a watering trough comprising a central reservoir containing warm water about which are disposed watering bowls whose walls are sunk into the volume of said central reservoir.

2. Field of the Invention

The present invention relates to an improvement on this type of watering trough, the shape of the watering trough being determined such that the watering bowls will be separated from each other by vertical partitions, these vertical partitions being portions of the central reservoir.

The present invention relates to a heated watering trough for livestock, of the type comprising a central body, forming a warm water reservoir, about which are disposed a plurality of watering bowls characterized by the fact that said central body is provided with a plurality of vertical indentations, each terminating at its base in a shoulder in which is sunk a watering bowl provided with a valve controlled by the animal; portions of the central body comprised between the indentations constitute separations between the different watering stations.

Preferably, the central portion comprises at least two indentations extending over the height of said central portion, this latter being such that the height of each indentation is about three times as great as that of the shoulder.

OBJECTS OF THE PRESENT INVENTION

Such an arrangement has the following advantages:
the watering bowls being sunk into the shoulders of the warm water reservoir, the water which the animal causes to flow thereinto by actuating the valve is maintained warm,
the indentations are sufficiently deep to constitute as it were corners in which the animals can insert their muzzles without conflict with each other.

BRIEF DESCRIPTION OF THE DRAWINGS

By way of non-limiting example and to facilitate comprehension of the invention, there is shown in the accompanying drawings.

DETAILED DESCRIPTION OF THE INVENTION

Referring to these figures, it will be seen that the heated watering trough, according to the invention, is constituted by a hollow body 1, adapted to be filled with warm water at a moderate temperature (between 14° C. and 20° C.).

Figure 1:
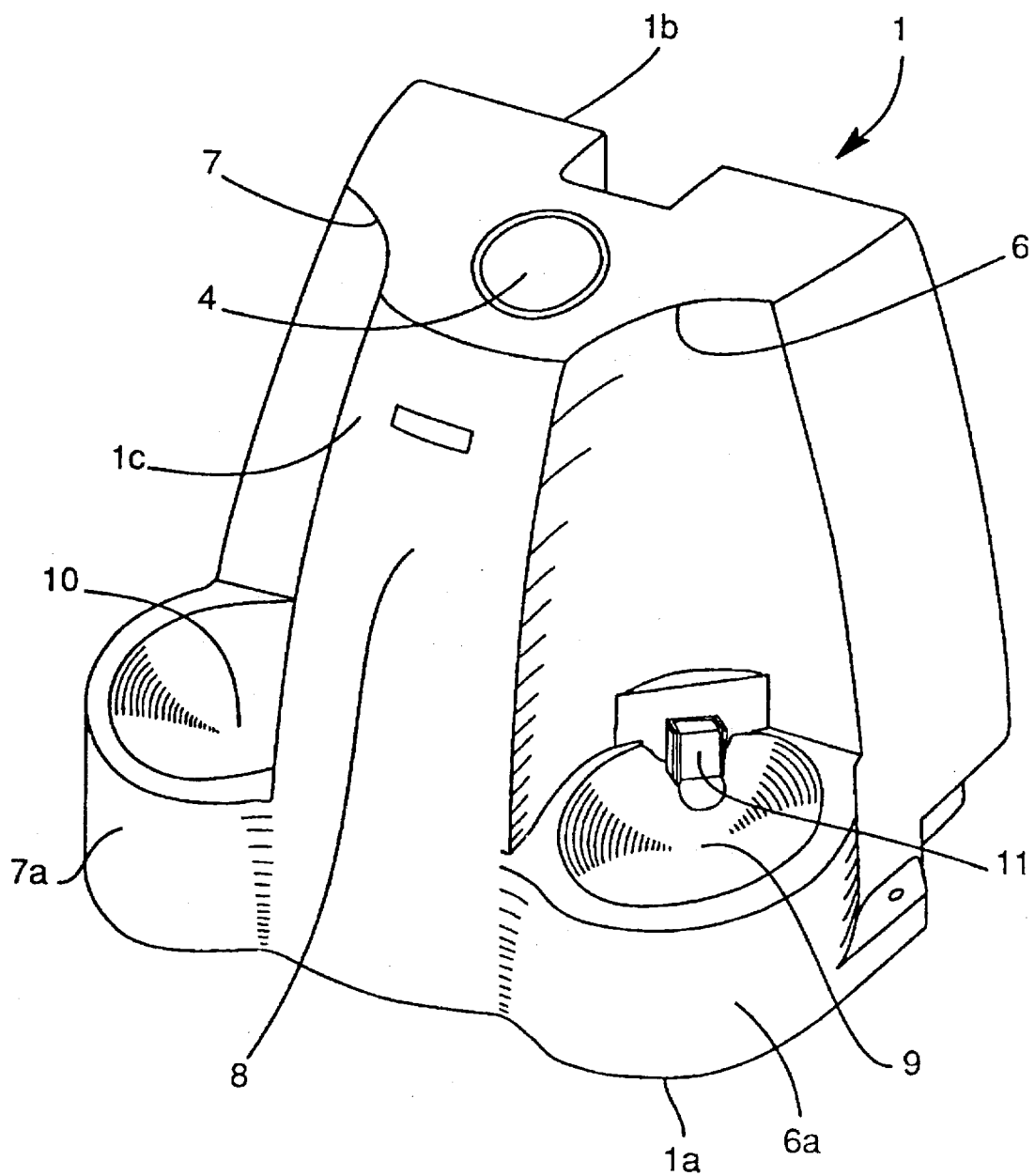
FIG. 1, a perspective view of an embodiment of the invention.
Figures 2, 4:
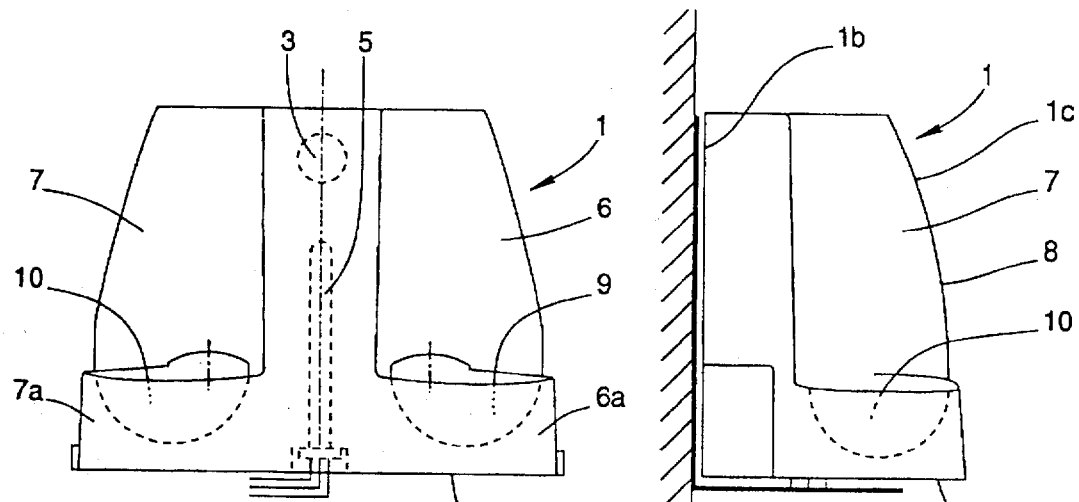
FIG. 2 a front view, on a reduced scale, of the device of FIG. 1.
FIG. 4, a side view, on a reduced scale, of the device of FIG. 1.
Figure 3:
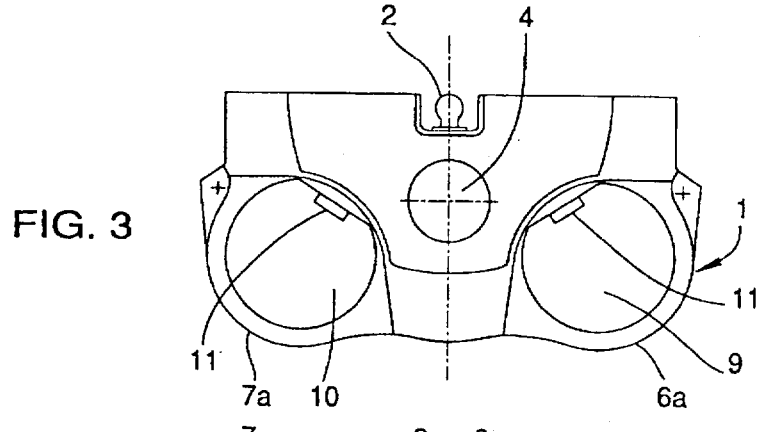
FIG. 3, a plan view, on a reduced scale, of the device of FIG. 1.

This body constitutes a warm water reservoir which is supplied by a water inlet channel 2 (FIG. 3) provided with a float valve 3 (FIG. 2) of known type and a plug 4. Within the reservoir 1 is disposed a heating resistance 5.

This body 1 has a flat bottom 1a, a flat back 1b and a front surface 1c which is bulged or protuberant. The water channel 2 is disposed in a recess provided in the rear surface of the back 1b. In this front surface 1c, are provided two hollow recesses or indentations 6–7, such that between two hollow recesses 6 and 7, is located a projecting portion 8.

These two recesses 6 and 7 do not extend over the entire height of body 1, but only over the upper portion of the latter, so as to provide at their base a shoulder 6a, 7a.

In these hollow shoulders 6a, 7a, are provided two hollow recesses 9 and 10, which have the shape of bowls, their shape being analogous to that of known watering bowls.

These bowls 9 and 10 are provided with valves that are conventional for animal watering bowls, which is to say a valve with a pushbutton 11 which, under pressure from the muzzle of an animal, opens the communication between the reservoir and the bowl.

Said bowls 9 and 10 can, according to a modification (not shown), be provided with a vertical float system rendering the supply of the bowls 9 and 10 of constant level, in particular for young animals which do not always push the pushbutton 11.

The operation of the device thus described is as follows.

The reservoir constituted by the body 1 is continuously filled with water by means of a float valve 3, connected to the water supply channel 2. This water is maintained at the desired temperature (14° C.–20° C.) by the heating resistance 5 provided with a thermostat.

When an animal pushes on one or the other of the pushbuttons 11, the corresponding bowl 9 or 10 fills with warm water which the animal can drink.

Preferably, the bowls 9 and 10 are flat bottomed so that there will remain but little water in the bottoms of the bowls, this water being susceptible of being polluted, because it is in contact with the water, which is not the case with water contained in the reservoir, which is itself protected from air.

The watering trough can be secured to a wall. It can also rest by its base 1 on a support positioned on the ground.

Figure 5:
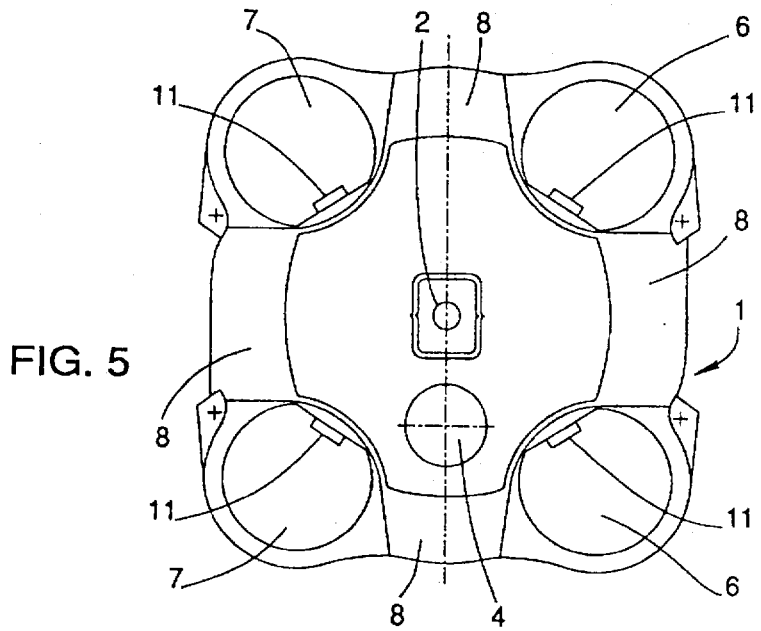
FIG. 5, a plan view of a modified embodiment.

In the example shown in FIGS. 1 to 4, there are provided only two recesses 6 and 7 and hence only two bowls 9 and 10, but the invention is not limited to this exact arrangement. As shown in FIG. 5, four bowls can be provided, and by suitably arranging the recesses 6 or 7, and hence the bowls which are at their base, even more can be provided. For example, there can be provided a circular body 1 with a ring of recesses, such as 6 or 7, disposed entirely thereabout, these recesses being separated by projecting portions, such as 8.

The portions, such as 8, which separate the bowls, such as 9 or 10, should always be fairly prominent to constitute separations which permit several animals to drink simultaneously without fighting among themselves.

I claim:

1. Heated watering trough for live-stock comprising a central body forming a warm water reservoir, said central body (1) having a plurality of vertical indentations (6, 7) each terminating at its lower end in a shoulder (6a, 7a) in which is provided a hollow recess (9, 10) comprising a watering bowl, water supply valve means for supplying said watering bowls with water from the central reservoir (1); portions (8) of said central body comprised between the indentations (6, 7) constituting separations between the various watering bowls permitting several animals to drink simultaneously without fighting among themselves, said reservoir including said portions (8) of said central body between said indentations (6, 7), said reservoir having portions extending below and partially surrounding said hollow recesses (9, 10).

2. Watering trough according to claim 1, wherein the body (1) serving as a reservoir comprises a flat back (1b), a protuberant front face (1c), two recesses (6, 7) separated by a projection (8) and two bowls (9, 10) sunk in the base (6a, 7a) of said recesses.

3. Watering trough according to claim 1, wherein the body (1) serving as a reservoir is provided with a plurality of recesses (6, 7 . . . ) disposed in a circle entirely about the central portion of said body (1), said recesses being separated by said projecting portions (8).

4. Watering trough according to claim 1, in which said bowls (9, 10) are provided with a pushbutton (11) that the livestock pushes with its muzzle.

* * * * *